(12) United States Patent
Costantino et al.

(10) Patent No.: US 6,733,740 B1
(45) Date of Patent: May 11, 2004

(54) PRODUCTION OF DIELECTRIC PARTICLES

(75) Inventors: Stephen A. Costantino, Reading, PA (US); Sridhar Venigalla, Macungie, PA (US); Jeffrey A. Kerchner, Fleetwood, PA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/689,093

(22) Filed: Oct. 12, 2000

(51) Int. Cl.$^7$ .............................................. C01G 23/00
(52) U.S. Cl. ..................... 423/598; 264/234; 264/620; 501/137
(58) Field of Search ......................... 264/234

(56) References Cited

U.S. PATENT DOCUMENTS

| | | | |
|---|---|---|---|
| 3,490,927 A | 1/1970 | Kahn et al. | |
| 3,717,487 A | 2/1973 | Hurley et al. | |
| 3,725,539 A | 4/1973 | Spangenberg | |
| 4,643,984 A | 2/1987 | Abe et al. | |
| 4,764,493 A | 8/1988 | Lilley et al. | |
| 4,829,033 A | 5/1989 | Menashi et al. | |
| 4,832,939 A | 5/1989 | Menashi et al. | |
| 4,863,883 A | 9/1989 | Menashi et al. | |
| 4,880,757 A | 11/1989 | Henslee et al. | |
| 4,898,843 A | 2/1990 | Matushita et al. | |
| 4,929,574 A | * 5/1990 | Iltis ............................ | 501/137 |
| 4,939,108 A | 7/1990 | Dean | |
| 5,011,804 A | 4/1991 | Bergna et al. | |

(List continued on next page.)

FOREIGN PATENT DOCUMENTS

| | | |
|---|---|---|
| EP | 0 894 779 A1 | 2/1999 |
| EP | 1 013 608 A1 | 6/2000 |
| WO | WO 96/06811 A2 | 3/1996 |
| WO | WO 98/35920 A1 | 8/1998 |

OTHER PUBLICATIONS

Bruce D. Begg et al., "Effect of Particle Size on the Room–Temperature Crystal Structure of Barium Titanate," *J. Am. Ceram. Soc.*, vol. 77, No. 12, (1994), pp. 3186–3192.

Hiroyuki Ikawa et al., "DC Electrorheology of Fluid Suspending Barium Titanate In the Range of Ferroelectric Size Effects," *Rerroelectrics*, 1997, vol. 203, pp. 241–248.

R. Vivekanandan et al., "Characterization of Barium Titanate Fine Powders Formed From Hydrothermal Crystallization," *Powder Technology* 57 (1989) 181–192.

Kenji Uchino et al., "Dependence of the Crystal Structure on Particle Size in Barium Titanate," *J. Am. Ceram. Soc.*, 72 (8) 1555–58 (1989).

Vivekanandan, R. et al., "Hydrothermal Preparation of Ba (Ti, Zr)$O_3$ Fine Powders," *Mat. Res. Bull.*, vol. 22, pp. 99–108, 1986.

International Search Report, International Application No. PCT/US 01/31327; Feb. 25, 2002.

D.A. Payne et al., "Inhibition of Grain Growth in Barium Titanate", J. Am. Ceram. Soc., p. 491, Sep. 1967.

S.A. Bruno et al., "High Performance Multilayer Capacitor Dielectrics from Chemically Prepared Powders", J. Am. Ceram. Soc. 76:1233–1241, May 1993.

(List continued on next page.)

*Primary Examiner*—Christopher A. Fiorilla

(57) ABSTRACT

The invention provides a method for producing barium titanate-based particulate compositions. The method includes a heat treatment step, separate from a sintering step, that involves treating a barium titanate-based particulate composition at a temperature between about 700° C. and about 1150° C. to increase average particle size. The increased average particle size can improve the electrical properties (i.e., dielectric constant and dissipation factor) of the heat-treated composition as compared to the composition prior to heat treating. The heat-treated composition may be further processed, for example, by producing a dispersion which may be cast and sintered to form a dielectric layer in electronic components including MLCCs.

61 Claims, 1 Drawing Sheet

U.S. PATENT DOCUMENTS

| | | |
|---|---|---|
| 5,029,042 A | 7/1991 | Dean |
| 5,082,810 A | 1/1992 | Bergna et al. |
| 5,082,811 A | 1/1992 | Bruno |
| 5,084,424 A | 1/1992 | Abe et al. |
| 5,086,021 A | 2/1992 | Sasaki et al. |
| 5,112,433 A | 5/1992 | Dawson et al. |
| 5,155,072 A | 10/1992 | Bruno et al. |
| 5,229,101 A | 7/1993 | Watanabe et al. |
| 5,296,426 A | 3/1994 | Burn |
| 5,362,472 A | 11/1994 | Lauter et al. |
| 5,445,806 A | 8/1995 | Kinugasa et al. |
| 5,453,262 A | 9/1995 | Dawson et al. |
| 5,590,387 A | 12/1996 | Schmidt et al. |
| 5,650,367 A | 7/1997 | Fujikawa et al. |
| 5,757,610 A | 5/1998 | Wada et al. |
| 6,007,870 A | 12/1999 | Kono et al. |
| 6,129,903 A | 10/2000 | Kerchner |
| 6,169,049 B1 * | 1/2001 | Witham ..................... 501/137 |
| 6,214,756 B1 | 4/2001 | Adair et al. |
| 6,268,054 B1 | 7/2001 | Costantino et al. |
| 6,284,216 B1 | 9/2001 | Sakai et al. |

OTHER PUBLICATIONS

T.M. Harkulich et al., "Ferroelectrics of Ultrafine Particle Size: II, Grain Growth Inhibition Studies", J. Am. Ceram. Soc., 49:295–299, Jun. 1996.

W. Hertle, "Kinetics of Barium Titanate Synthesis", J. Am. Ceram. Soc., 71:879–883, Oct. 1988.

M. Kahn, "Preparation of Small–Grained and Large–Grained Ceramics from Nb–Doped $BaTiO_3$", J. Am. Ceram. Soc., 54:452–454, Sep. 1971.

H. Kumazawa et al., "Preparation of Barium Titanate Ultrafine Particles from Amorphous Titania by a Hydrothermal Method and Specific Dielectric Constants of Sintered Discs of the Prepared Particles", J. Mat. Science, 31:2599–2602, 1996.

T.R.N. Kutty et al., "Precipitation of Rutile and Anatase ($TiO_2$) Fine Powders and Their Conversion of $MtiO_3$ (M=Ba, Sr, Ca) By the Hydrothermal Method", Mat. Chem. and Physics, 19:533–546, 1988.

S. Wada et al., "Preparation of Barium Titanate Fine Particles by Hydrothermal Method and Their Characterization", J. Ceram. Soc. of Japan, 103:1220–1227, 1995.

* cited by examiner

PRODUCTION OF DIELECTRIC PARTICLES

FIELD OF THE INVENTION

The invention relates generally to dielectric compositions and, more particularly, to a method for producing barium titanate-based dielectric compositions using a heat treatment step.

BACKGROUND OF THE INVENTION

Barium titanate-based compositions, which include barium titanate ($BaTiO_3$) and its solid solutions, may be used to form dielectric layers in electronic devices such as multilayer ceramic capacitors (ILCCs). The barium titanate-based compositions are typically produced as micron-sized particles which may be further processed to form the dielectric layer. Such barium titanate-based particles may be formed in a variety of processes including hydrothermal processes, solid-state reaction processes, sol-gel processes, as well as precipitation and subsequent calcination processes, such as oxalate-based processes.

To enhance certain electrical and mechanical properties of the resulting layer, dopants may be added to the barium titanate-based compositions. Typically, the dopants are metallic compounds, often in the form of oxides. In some cases, dopant particles may be mixed and milled with the barium titanate-based particles to promote homogeneous distribution of the dopant throughout the composition. In other cases, the dopant may be coated upon the surfaces of barium titanate-based particles to provide homogenous distribution of the dopant materials without milling.

Dielectric layers of MLCCs are usually prepared from a dispersion of the barium titanate-based particulate composition in an aqueous medium which may also include a polymeric binder and/or dispersing agent. The dispersion, or slip, may be cast to provide a green layer of ceramic dielectric material. A patterned electrode material is then formed on the green layer to form a structure that is stacked to provide a laminate of alternating layers of green ceramic dielectric and electrode. The stacks are diced into MLCCs-sized cubes which are heated to sinter the particles of barium titanate-based material to form a capacitor structure with laminated, dense ceramic dielectric and electrode layers. During sintering, increased ceramic dielectric density is achieved as a result of the fusion and consolidation of the particles to remove pores between the particles and to form grains.

The miniaturization of electronic components and the desire to increase the volumetric efficiency of MLCCs has led to the production of dielectric layers of ever-decreasing thickness. To produce thinner layers, the barium titanate-based compositions must have sufficiently small and uniform particles which, in some cases, may have a relatively low density as compared to larger particles. Certain electrical properties may be inferior in compositions that include such small particles. For example, the dielectric constant may be lower and the dissipation factor may be higher for compositions having smaller particle sizes and/or lower particle densities. Therefore, the particle size must be balanced with the electrical properties when forming thin dielectric layers.

Accordingly, it is desirable to produce a barium titanate-based composition having a small particle size and desirable electrical properties.

SUMMARY OF THE INVENTION

The invention provides a method for producing barium titanate-based particulate compositions.

In one aspect, the invention provides a method for heat treating a barium titanate-based particulate composition. The method includes heating a barium titanate-based particulate composition at a temperature between about 700° C. and about 1150° C. to form a heat-treated particulate composition.

In another aspect, the invention provides a method for heat-treating a barium titanate-based particulate composition. The method includes heating a barium titanate-based particulate composition at a temperature and for a time sufficient to cause particle growth and insufficient to cause particle sintering thereby forming a heat-treated particulate composition.

Other advantages, aspects, and features of the invention will become apparent from the following detailed description.

DETAILED DESCRIPTION

Figure 1:
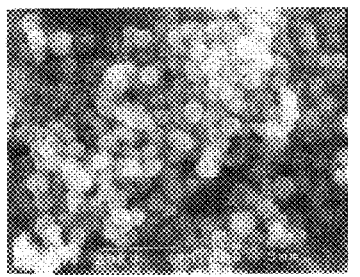
FIG. 1 is an SEM photo showing an illustrative portion of the barium titanate composition in Example 1 prior to heat treatment.

The invention provides a method for producing barium titanate-based particulate compositions. The method includes a heat treatment step, separate from a sintering step, that involves treating a barium titanate-based particulate composition at a temperature between about 700° C. and about 1150° C. to increase average particle size. The increased average particle size can improve the electrical properties (i.e., dielectric constant and dissipation factor) of the heat-treated composition as compared to the composition prior to heat treating. The heat-treated composition may be further processed, for example, by producing a dispersion which may be cast and sintered to form a dielectric layer in electronic components including MLCCs.

The barium titanate-based particles subjected to heat treatment may be produced according to any number of techniques known in the art including hydrothermal processes, solid-state reaction processes, sol-gel processes, as well as precipitation and subsequent calcination processes, such as oxalate-based processes. In many cases, it may be preferable to produce the barium titanate-based particles using a solution-based process such as a hydrothermal process. Hydrothermal processes generally involve mixing a barium source with a titanium source in an aqueous environment to form a hydrothermal reaction mixture which is maintained at an elevated temperature to promote the formation of barium titanate particles. Barium titanate solid solution particles may be produced hydrothermally by adding the desired divalent and/or tetravalent metal source(s) to the hydrothermal reaction mixture. Suitable hydrothermal processes for forming barium titanate-based particles have been described, for example, in commonly-owned U.S. Patent Nos. 4,829,033, 4,832,939, and 4,863,883, which are incorporated herein by reference in their entireties. Hydrothermally-produced barium titanate-based particles are typically substantially spherical, and have a small average particle size (e.g., less than about 0.5 micron) and a relatively low density (e.g., less than about 5.5 g/cm³).

Hydrothermally-produced barium titanate-based particles may be particularly well-suited to utilize the heat treatment technique of the present invention to increase average particle size and/or density in order to enhance certain electrical properties.

One example of a hydrothermal process used to form the barium titanate-based particles involves introducing a solution of barium hydroxide ($Ba(OH)_2$) into a slurry of a hydrated titanium oxide gel at a temperature between about 40° C. and about 100° C. to form a reaction mixture. The hydrated titanium oxide gel is formed by mixing titanium oxychloride ($TiOCl_2$) and ammonium hydroxide ($NH_4(OH)$) to form the gel and, then, washing the gel. The reaction mixture is heated to a temperature between about 175° C. and about 225° C. to promote the formation of barium titanate ($BaTiO_3$) particles which remain suspended in the aqueous medium. After cooling, the suspension may be washed to remove any excess reactants such as barium hydroxide. In some embodiments, the suspension may not be washed. The suspension may then be dewatered, for example using a filter press, to increase its solid content. The high solids suspension may be used in further processing steps, as described further below.

Different production techniques may result in the barium titanate-based particles being in different physical states. In some embodiments, the particles may be a dry powder after production. Alternatively, the particles may be suspended in an aqueous or non-aqueous medium having a wide range of solids content. For example, the aqueous or non-aqueous suspension may include solids content between about 5 weight percent and about 90 weight percent based upon the total weight of the suspension.

As used herein, "barium titanate-based compositions" refers to barium titanate, solid solutions thereof, or other oxides based on barium and titanium having the general structure $ABO_3$, where A represents one or more divalent metals such as barium, calcium, lead, strontium, magnesium and zinc and B represents one or more tetravalent metals such as titanium, tin, zirconium, and hafnium. One type of barium titanate-based composition has the structure $Ba_{(1-x)}A_xTi_{(1-y)}B_yO_3$, where x and y can be in the range of 0 to 1, where A represents one or more divalent metal other than barium such as lead, calcium, strontium, magnesium and zinc and B represents one or more tetravalent metals other than titanium such as tin, zirconium and hafnium. Where the divalent or tetravalent metals are present as impurities, the value of x and y may be small, for example less than 0.1. In other cases, the divalent or tetravalent metals may be introduced at higher levels to provide a significantly identifiable compound such as barium-calcium titanate, barium-strontium titanate, barium titanate-zirconate, and the like. In still other cases, where x or y is 1.0, barium or titanium may be completely replaced by the alternative metal of appropriate valence to provide a compound such as lead titanate or barium zirconate. In other cases, the compound may have multiple partial substitutions of barium or titanium. An example of such a multiple partial substituted composition is represented by the structural formula $Ba_{(1-x-x'-x'')}Pb_xCa_{x'}Sr_{x''}O.Ti_{(1-y-y'-y'')}Sn_yZr_{y'}Hf_{y''}O_2$, where x, x', x'', y, y', and y'' are each greater than or equal to 0. In many cases, the barium titanate-based material will have a perovskite crystal structure, though in other cases it may not.

The barium titanate-based particles may have a variety of particle characteristics prior to the heat treatment step. Generally, though not always, the average particle size of the composition is less than about 0.50 micron prior to heat treatment. In some embodiments, the average particle size is less than about 0.40 micron prior to heat treatment; in some embodiments, less than about 0.25 micron prior to heat treatment; and, in some embodiments, less than about 0.1 micron prior to heat treatment. The term average particle size, as used herein, refers to the average size of primary particles in the composition. The average particle size of a composition is determined using SEM analysis.

In some embodiments, the composition, prior to heat treatment, may include aggregates of primary particles and/or agglomerates of aggregates and/or agglomerates of primary particles. As used herein, "aggregate" refers to two or more joined particles which cannot be separated by simple mechanical means such as high shear mixing. As used herein, "agglomerate" refers to two or more joined particles (or aggregates) which can be separated by simple mechanical means such as high shear mixing.

The barium titanate-based particles may also have a variety of shapes prior to heat treatment which may depend, in part, upon the process used to produce the particles. For example, milled barium titanate-based particles generally have an irregular, non-equiaxed shape, while hydrothermally-produced particles may be equiaxed and/or substantially spherical. In some embodiments, equiaxed and/or substantially spherical primary particles may be preferred.

The barium titanate-based composition may be a mixture of more than one barium titanate-based particulate component. Each particulate component may have different characteristics including any of the particle sizes, shapes or compositions described herein.

According to the method of the present invention, the barium titanate-based particulate composition is subjected to a heat-treatment step to form a heat-treated particulate composition. The heat treatment step involves heating the barium titanate-based particles to a temperature high enough and for a sufficient time to cause particle growth (and, in some cases, particle densification), but does not cause sintering. As used herein, "sintering" refers to the welding of particles together to form a monolithic body. A sintered body does not include individual particles, whereas the heat-treated particulate composition does include individual particles (which, as described above, may be primary particles, aggregates of primary particles, agglomerates of aggregates, or agglomerates of primary particles).

In some cases, the heat treatment step is conducted at conditions that does not cause necking between particles. In certain cases, particularly when relatively high temperatures are utilized, minor necking between particles may be observed. The minor necking between particles may be broken by conventional mixing or milling techniques. Preferably, the heat treatment conditions do not cause the formation of aggregates of particles that are inseparable by conventional mixing or milling techniques. In some cases, the heat-treated compositions are substantially free of particle aggregates inseparable by conventional mixing or milling techniques.

The heat treatment step comprises heating the particles to a temperature of greater than 700° C. In some embodiments, the particles are heated to a temperature between about 700° C. and about 1150° C.; and, in some embodiments, the particles are heated to a temperature between about 900° C. and about 1100° C. In some cases, the heat treatment time is at least one hour, and, in other cases several hours. However, the heat treatment step may utilize any temperature and may be carried out for a length of time sufficient to achieve the desired increase in average particle size and/or particle density. The ideal temperature and time of the heat treatment step depends upon the particle characteristics (e.g., composition, size, density) of the barium titanate-based particles prior to heat treatment and the desired particle characteristics after heat treatment.

The composition of the barium titanate-based particles before and after heat treatment is essentially unchanged with the exception of the possible elimination of certain impurities (e.g., hydroxyls), as described further below. Thus, the heat treatment step is distinguished from calcination steps which promote chemical reactions between particulate species to form particles having a different composition.

The percentage increase in average particle size resulting from the heat treatment may be controlled using heat treatment parameters (e.g., temperature, time) to produce a heat-treated composition having particles of the desired final size. The increase in average particle size is typically greater than 25%, in some cases greater than 50%, in some cases greater than 100%, and in some cases greater than 200%.

The average particle size of the heat-treated composition will depend upon the average particle size of the composition (as described above) prior to heat treatment and the process parameters of the heat treatment step. In some cases when the initial average particle size is less than about 0.1 micron, the average particle size may be increased to between about 0.2 micron and about 0.4 micron using heat treatment. In some cases when the initial average particle size is between about 0.3 micron and about 0.4 micron, the average particle size may be increased to between about 0.6 micron and about 1.0 micron using heat treatment. In many cases for MLCC applications, it is desirable for the heat-treated composition to have an average particle size of between about 0.2 micron and about 1.0 micron.

As described above, the heat treatment step also may increase the density of the barium titanate-based particles. It should be understood that the density referred to herein is the density of particles as opposed to the density of a composition of particles which includes voids between particles. In some cases, the increased density may approach the theoretical limit for barium titanate-based compositions which generally is considered to be about 6.0 g/cm$^3$.

The heat-treated particles may have a variety of shapes. The shape of the heat-treated particles depends, in part, on the shape of the barium titanate-based particles prior to heat treating. In cases where substantially spherical barium titanate-based particles are utilized, the heat-treated particles may also be substantially spherical. In some cases, substantially spherical particles are preferred because of their ability to be closely packed which can increase the density of the resulting dielectric layer.

The characteristics (e.g., average particle size and particle density) of the barium titanate-based particles after heat treatment are selected to provide a composition with the appropriate electrical properties. The heat treatment step can increase the dielectric constant and/or decrease the dissipation factor of a barium titanate-based composition. For many applications including MLCC's, it is desirable to utilize compositions with high dielectric constants and low dissipation factors. Thus, the heat treatment step may be advantageous in the production of barium titanate-based compositions. As discussed further below, dopants also may be added to the heat-treated barium titanate-based composition to further enhance certain properties including dielectric constant and dissipation factor.

Advantageously, the heat treatment step may eliminate impurities from the barium titanate-based particles that can reduce the electrical properties of the composition. Such impurities may be incorporated into the particulate composition during production. For example, barium titanate-based particles produced using solution processes (e.g., hydrothermal processes) may include solvent-based impurities such as hydroxyl (OH) groups. These impurities can diffuse to the surface of the particles and are evaporated during heat treatment.

After heat treatment, the barium titanate-based composition may be further processed as desired. In some embodiments, one or more dopant material may be added to the heat-treated composition prior to forming the dielectric layer to enhance electrical properties. Any dopant known in the art may be added to the composition. Dopants are often metal compounds, such as oxides or hydroxides. Suitable dopant metals may include lithium, magnesium, calcium, strontium, scandium, zirconium, hafnium, vanadium, niobium, tantalum, manganese, cobalt, nickel, zinc, boron, silicon, antimony, tin, yttrium, lanthanum, lead, bismuth or a Lanthanide element. The dopants may be added in particulate form and mixed into the barium titanate-based composition to promote the formation of a homogeneous mixture. In other cases, one or more dopant layers may be coated onto the surfaces of the heat-treated barium titanate-based particles. Such dopant layers are generally thin and may have a thickness of less than 10 nm. In some embodiments, certain types of dopants may be added in particulate form while other types of dopants may be coated onto the surfaces of the heat-treated particles. The barium titanate-based composition, including dopants, may be further processed as desired.

In one preferred embodiment of the invention, the method includes depositing one or more coating layer onto the surfaces of the heat-treated particles. Prior to the coating step, the heat-treated particles may be dispersed, for example, in water by emulsification. An appropriate solution containing the selected dopant metal in ionic form may be added to the dispersion and, subsequently, a dopant metal compound (e.g., an oxide or hydroxide) may be precipitated onto the particle surfaces. This step may be repeated to sequentially coat additional dopant layers, if desired, to produce a coating having multiple chemically distinct layers. In these embodiments, the particles may be maintained in an aqueous medium between sequential coating steps. In some embodiments, the coated particles may be washed between coating steps to remove any residual species from previous coating steps. After the coating step, the particles may be washed and dewatered to increase the solids content. In some embodiments, the coated particles may not be washed and simply dewatered. In some embodiments, the composition may be dried, for example in a vacuum drying step, to provide a powder that may be used in further processing steps to form the dielectric layer. In other embodiments, after dewatering, the high solids content suspension may be directly processed to form the dielectric layer.

In some embodiments, the A/B ratio of the barium titanate-based composition may be adjusted prior to further processing which may include any one of drying, casting to form a slip, and forming a dielectric layer. As used herein, A/B ratio is defined as the ratio of divalent metals (e.g., alkaline earth metals such as Ba, Ca, etc.) to tetravalent metals (Ti, Zr, Sn, etc.) in the overall dielectric composition. In some cases, the A/B ratio is adjusted to a value greater than 1.0. Barium titanate-based compositions having A/B ratios greater than 1.0 may be desirable in certain MLCCs applications to the improve compatibility of the composition with base metal electrodes.

The A/B ratio may be adjusted according to any technique known in the art. In some embodiments, the A/B ratio may be increased by adding an insoluble divalent metal (e.g., Ba) compound in particulate form to the composition. In other embodiments, the insoluble divalent metal compound (e.g., $BaCO_3$) may be formed, for example, in a precipitation reaction between an insolubilizing agent and a divalent metal. The insoluble divalent metal compound may be precipitated in particulate form or as a coating on surfaces of the barium titanate-based particles. The coating may be provided similarly, and in the same step, as the dopant coatings described above. In some embodiments, it may be preferable to deposit the divalent metal compound coating on the particle surfaces as the first coating layer subsequent to depositing the dopant coating layers.

As described above, the heat-treated barium titanate-based compositions are typically processed to form dielectric layers in electronic components, such as MLCCs. Such processing techniques are known in the art. For example, the heat-treated barium titanate-based composition may be dispersed in an aqueous medium which may also include any one of a polymeric binder, a dispersing agent, or other additives such as sintering aids. The dispersion may be cast onto a substrate to form a layer. Additional layers may be deposited and, in some cases, patterned on top of the layer. The resulting structure may be sintered to form the dielectric layer. The sintering step may, for example, involve heating the composition to a temperature of between about 1150° C. and about 1400° C. If sintering aids are added to the heat-treated composition, the sintering step may utilize lower temperatures. The dielectric layer formed from the heat-treated barium titanate-based particles can have excellent electrical properties (e.g., high dielectric constant and low dissipation factor) and may be thin, if desired.

The present invention will be further illustrated by the following example, which is intended to be illustrative in nature and are not to be considered as limiting the scope of the invention.

EXAMPLE

Barium titanate-based particles were heat-treated according to a method of the present invention.

Barium titanate ($BaTiO_3$) particles were produced in a hydrothermal process by mixing a barium source and a titanium source in a hydrothermal reactor to form a reaction mixture which was maintained at a temperature between about 150° C. and about 200° C. until the reaction completed. The resulting barium titanate particles had an average particle size of about 0.25 microns as determined by scanning electron microscope (SEM) analysis. FIG. 1 is an SEM photo showing an illustrative portion of the particulate composition. BET analysis yielded a surface area of 6.28 $m^2/g$.

A portion of the barium titanate particulate composition was heat-treated in a furnace at ambient atmosphere and a portion of the barium titanate particulate composition was maintained as a non heat-treated control composition.

The heat treatment step involved ramping the furnace temperature from room temperature to 1000° C. at a rate of about 200° C./hour. The furnace temperature was maintained at 1000° C. for a time period of two hours and, then, furnace-cooled to room temperature.

Figure 2:
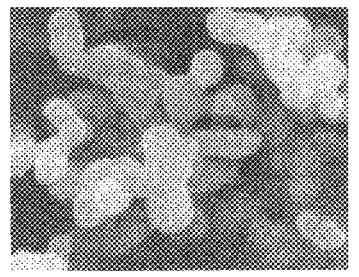
FIG. 2 is an SEM photo showing an illustrative portion of the heat-treated barium titanate position in Example 1.

The heat-treated particulate composition had an average particle size of about 0.60 microns as determined by SEM analysis. Slight necking between some of the heat-treated particles was observed. FIG. 2 is an SEM photo showing an illustrative portion of the heat-treated particulate composition. BET analysis yielded a surface area of 2.05 $m^2/g$.

Figure 3:
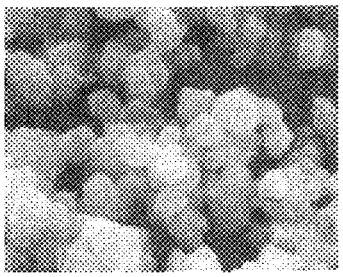
FIG. 3 is an SEM photo showing an illustrative portion of the re-dispersed heat-treated barium titanate composition in Example 1.

The heat-treated particles were dispersed in de-ionized water using a horizontal mill to form a slurry having 25% by weight solids. A portion of the particles were dried. SEM analysis to revealed that the slight necking between particles was eliminated, that the average particle size In was about 0.60 microns, and that the particle shape was substantially spherical. Thus, the heat-treated particles were readily dispersible. FIG. 3 is an SEM photo showing an illustrative portion of the re-dispersed heat-treated particulate composition. BET analysis yielded a surface area of 2.95 $m^2/g$.

The re-dispersed heat-treated particulate composition was further processed to form pellet samples and MLCC samples. The control (non-heat-treated) particulate composition, as described above, was also further processed to form control pellet samples and control MLCC samples.

Using both compositions, the pellet samples were formed by adding an ethylene glycol binder (about 3 weight percent) to the composition, drying the composition to form a powder which was uniaxially pressed into green pellets having a diameter of about 0.5 inches and a thickness of about 3 mm. The pellets were sintered (at 1250° C. for heat-treated composition and at 1300° C. for non-heat-treated composition).

Using both compositions, MLCC samples were formed by creating a slip, casting the slip to form a thin ceramic green sheet of about 5 microns, laminating the sheet with a Ni-electrode material, and cutting the sheet into cubes. The cubes were sintered to form MLCC samples (at 1250° C. for heat-treated composition and at 1300° C. for non-heat-treated composition). The density of the sintered composition in the control pellets and control MLCC samples was about 5.6 $g/cm^3$. The density of the sintered composition in the heat treated pellets and the heat-treated MLCC samples was about 5.8 $g/cm^3$.

The pellet samples and MLCC samples were analyzed using an impedance analyzer. The capacitance and dissipation factor were measured at 25° C., 1 KHz frequency, and 1 Volt bias. The dielectric constants were calculated from the capacitance measurements. The results are summarized in the following table.

| Sample | Dielectric Constant (K) | Dissipation Factor (DF) | K/DF Ratio |
|---|---|---|---|
| Heat-treated pellet | 2545 | 0.45 | 5655 |
| Control pellet | 2039 | 0.61 | 3342 |
| Heat-treated MLCC | 3050 | 3.2 | 953.1 |
| Control MLCC | 2000 | 4.35 | 459.8 |

The results show an increased dielectric constant (K) and a decreased dissipation factor (DF) for the heat-treated samples. The increase in dielectric constant and decrease in dissipation factor are both advantageous for MLCC applications.

Although particular embodiments of the invention have been described in detail for purposes of illustration, various changes and modifications may be made without departing from the scope and spirit of the invention. Accordingly, the invention is not to be limited except by the appended claims.

What is claimed is:

1. A method for heat treating a barium titanate-based particulate composition comprising:
   hydrothermally-producing a barium titanate-based particulate composition;
   heating the titanate-based particulate composition at a temperature between about 700° C. and about 1150° C. to form a heat-treating particulate composition, wherein the heat-treated particulate composition has an A/B ratio; and
   adjusting the A/B ratio of the heat-treated particulate composition.

2. The method of claim 1, comprising heating the barium titanate-based particulate composition at a temperature between about 900° C. and about 1100° C.

3. The method of claim 1, wherein the barium titanate-based particulate composition has an average particle size of less than about 0.25 micron prior to heating.

4. The method of claim 1, wherein the heat-treated composition has an average particle size of at least 25% greater that the average particle size of the barium titanate-based particulate composition.

5. The method of claim 4, wherein the heat-treated composition has a average particles size of at least 100% greater that the average particles size of the barium titanate-based particulate composition.

6. The method of claim 5, wherein the heat-treated composition has a average particles size of at least 200% greater that the average particle size of the barium titanate-based particulate composition.

7. The method of claim 1, wherein the heat-treated composition has a average particle size of between about 0.2 micron and about 1.0 micron.

8. The method of claim 1, wherein the heat-treated particulate composition has essentially the same composition as the barium titanate-based composition.

9. The method of claim 1, wherein the barium titanate-based particulate composition comprises substantially spherical particles before the heating step.

10. The method of claim 1, wherein the heat-treated composition compromises substantially spherical particles after the heating step.

11. The method of claim 1, wherein the barium titanate-based particulate composition is heated for a time period of at least one hour.

12. The method of claim 1, further comprising depositing at least one dopant coating layer surfaces of particles of the heat-treated composition.

13. The method of claim 1, comprising adjusting the A/B ratio of the heat-treated composition by depositing a coating a barium compound on surfaces of particles of the heat-treated composition.

14. The method of claim 1, further comprising sintering the heat-treated composition.

15. The method of claim 14, comprising sintering the heat-treated composition at a temperature between about 1150° C. and about 1400° C.

16. The method of claim 1, further comprising forming a dielectric layer form the heat-treated composition.

17. The method of claim 1, wherein the heat-treated composition has an average particle size that is greater than an average particles size of the barium titanate-based particulate composition.

18. The method of claim 1, wherein the heat-treated composition has an average particle size of at least 50% greater than an average size of the barium titanate-based particulate composition.

19. The method of claim 1, comprising adjusting the A/B ratio of the heat-treated particulate composition to a value of greater than 1.0.

20. The method of claim 1, comprising adjusting the A/B ratio of the heat-treated composition by depositing a coating comprising a divalent metal compound on surfaces of particles of the heat-treated composition.

21. A method for heat treating barium titanate-based particulate composition comprising:
    hydrothermally-producing a barium titanate-based particulate composition; and
    heating a barium titanate-based particulate composition at a temperature and for a time sufficient to cause particle growth and insufficient to cause particle sintering thereby forming a heat-treated particulate composition having an average size of at least 50% greater than an average size of the barium titanate-based particulate composition.

22. The method of claim 21, comprising heating the barium titanate-based particulate composition at a temperature and for a time sufficient to cause particle growth to a selected average particle size.

23. The method of claim 22, comprising heating the barium titanate-based particulate composition at a temperature and for a time sufficient to cause the average particle size of the barium titanate-based particulate composition to increase by at least 25%.

24. The method of claim 22, comprising heating the barium titanate-based particulate composition at a temperature and for a time sufficient to cause the average particle size of the barium titanate-based particulate composition to increase by at least 100%.

25. The method of claim 21, further comprising depositing at least one dopant coating layer on surfaces of particles of the heat-treated composition.

26. The method of claim 21, wherein the heat-treated composition has an A/B ratio and further comprising adjusting the A/B ratio of the heat-treated composition.

27. The method of claim 26, comprising adjusting the A/B ratio of the barium titanate-based composition by depositing a coating comprising a barium compound on surfaces of particles of the heat-treated composition.

28. The method of claim 26, comprising adjusting the A/B ratio of the heat-treated particulate composition to a value of greater than 1.0.

29. The method of claim 26, comprising adjusting the A/B ratio of the heat-treated composition by depositing a coating comprising a divalent metal compound on surfaces of of the heat-treated composition.

30. The method of claim 21, further comprising sintering the heat-treated composition.

31. The method of claim 30, comprising sintering the heat-treated composition at a temperature between 1150° C. and about 1400° C.

32. The method of claim 21, further comprising forming a dielectric layer form the heat-treated composition.

33. The method of claim 21, wherein the heat-treated particulate composition has essentially the same composition as the barium titanate-based composition.

34. A method for heat treating barium titanate-based particulate composition comprising:
    hydrothermally-producing a barium titanate-based particulate composition; and
    heating a barium titanate-based particulate composition at a temperature between about 900° C. and about 1110° C. to form a heat-treated particulate composition.

35. The method of claim 34, wherein the barium titanate-based particulate composition has an average particle size of less than about 0.25 micron prior to heating.

36. The method of claim 34, wherein the heat-treated particulate composition has an average particle size that is greater than an average particle size of the barium titanate-based particulate composition.

37. The method of claim 34, wherein the heat-treated particulate composition has an average particle size of at least 50% greater than an average particle size of the barium titanate-based particulate composition.

38. The method of claim 34, wherein the heat-treated particulate composition has an average particle size of at least 100% greater than an average particle size of the barium titanate-based particulate composition.

39. The method of claim 34, wherein the heat-treated particulate composition has an average particle size of between about 0.2 micron and about 1.0 micron.

40. The method of claim 34, wherein the barium titanate-based particle composition comprises substantially spherical particles before the heating step.

41. The method of claim 34, wherein the heat-treated particulate composition comprises substantially spherical particles after the heating step.

42. The method of claim 34, further comprising depositing at least one dopant coating layer on surfaces of particles of the heat-treated particulate composition.

43. The method of claim 34, wherein the heat-treated particulate composition has an A/B ratio and further comprising adjusting the A/B ratio of the heat-treated particulate composition.

44. The method of claim 43, comprising adjusting the A/B ratio of the heat-treated particulate composition by depositing a coating comprising a barium titanate-based compound on surfaces of particles of the heat-treated particulate composition.

45. The method of claim 43, comprising adjusting the A/B ratio of the heat-treated particulate composition to a value of greater than 1.0.

46. The method of claim 43, comprising adjusting the A/B ratio of the heat-treated composition by depositing a coating comprising a barium titanate-based compound on surfaces of particles of the heat-treated composition.

47. The method of claim 34, further comprising sintering the heat-treated particulate composition.

48. The method of claim 34, further comprising forming a dielectric layer from the heat-treated particulate composition.

49. A method for heat treating a barium titanate-based particulate composition comprising:

heating a barium titanate-based particulate composition at a temperature between about 700° C. and about 1150° C. to form a heat-treated particulate composition, the heat-treated particulate composition having an average size of at least 50% greater than an average particle size of the barium titanate-based particulate composition, the heat-treated particulate composition having an A/B ratio; and adjusting the A/B ratio of the heat-treated particulate composition.

50. The method of claim 49, further comprising hydrothermically-producing the barium titanate-based particulate composition.

51. The method of claim 49, wherein the barium titanate-based particulate composition has an average particle size of less than about 0.25 micron prior to heating.

52. The method of claim 49, wherein the heat-treated particulate composition has an average particle size of at least 100% greater than an average particle size of the barium titanate-based particulate composition.

53. The method of claim 49, wherein the heat-treated particulate composition has an average particles size of between about 0.2 micron and about 1.0 micron.

54. The method of claim 49, wherein the barium titanate-based particle composition comprises substantially spherical particles before the heating step.

55. The method of claim 49, wherein the heat-treated particulate composition comprises substantially spherical particles after the heating step.

56. The method of claim 49, further comprising depositing at least one dopant coating layer on surfaces of particles of the barium titanate-based composition.

57. The method of claim 49, comprising adjusting the A/B ratio of the heat-treated particulate composition by depositing a coating comprising a barium compound on surfaces of particulate of the heat-treated particulate composition.

58. The method of claim 49, further comprising sintering the heat-treated particulate composition.

59. The method of claim 49, further comprising forming a dielectric layer from the heat-treated particulate composition.

60. The method of claim 49, comprising adjusting the A/B ratio of the heat-treated particulate composition to a value of greater than 1.0.

61. The method of claim 49, comprising adjusting the A/B ratio of the heat-treated composition by depositing a coating comprising a divalent metal compaund on surfaces of particles of the heat-treated composition.

* * * * *